US008226464B2

(12) United States Patent
Kim

(10) Patent No.: US 8,226,464 B2
(45) Date of Patent: Jul. 24, 2012

(54) GAMING SYSTEM AND A METHOD OF GAMING

(75) Inventor: Hyong Joo Kim, Meadowbank (AU)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 735 days.

(21) Appl. No.: 12/339,727

(22) Filed: Dec. 19, 2008

(65) Prior Publication Data

US 2009/0186685 A1 Jul. 23, 2009

(30) Foreign Application Priority Data

Dec. 21, 2007 (AU) ................................ 2007907036

(51) Int. Cl.
*A63F 9/24* (2006.01)
*A63F 13/00* (2006.01)
*G06F 19/00* (2006.01)

(52) U.S. Cl. .......... 463/17; 463/22; 273/139; 273/142 D

(58) Field of Classification Search .............. 463/16–23, 463/30–32; 273/138.1, 139, 141 R, 142 R, 273/143 R, 142 B, 142 H, 142 HA, 145 R, 273/146, 268, 461, 142 D
See application file for complete search history.

(56) References Cited

U.S. PATENT DOCUMENTS

| | | | | |
|---|---|---|---|---|
| 5,181,028 | A | 1/1993 | Sharpe et al. | |
| 5,702,308 | A | 12/1997 | Alexander, Jr. | |
| 6,236,940 | B1 | 5/2001 | Rudow et al. | |
| 6,319,142 | B1 | 11/2001 | Ciniello | |
| 6,851,674 | B2 | 2/2005 | Pierce et al. | |
| 7,000,922 | B1 | 2/2006 | Norton | |
| 7,195,564 | B2 | 3/2007 | Han | |
| 2004/0048649 | A1 * | 3/2004 | Peterson et al. | 463/20 |
| 2005/0054415 | A1 * | 3/2005 | Kaminkow et al. | 463/16 |
| 2005/0119040 | A1 * | 6/2005 | Berman et al. | 463/16 |
| 2006/0084487 | A1 | 4/2006 | Pierce et al. | |
| 2007/0054755 | A1 | 3/2007 | Cornfield | |

FOREIGN PATENT DOCUMENTS

| | | |
|---|---|---|
| BE | 1016110 | 3/2006 |
| DE | 3133348 | 3/1983 |
| EP | 1767254 | 3/2007 |
| EP | 1790399 | 5/2007 |
| EP | 1820545 | 8/2007 |
| EP | 1820546 | 8/2007 |
| GB | 190813231 | 0/1909 |
| GB | 346696 | 4/1931 |
| GB | 353155 | 7/1931 |
| GB | 406130 | 2/1934 |
| GB | 425237 | 3/1935 |
| GB | 427040 | 4/1935 |

(Continued)

*Primary Examiner* — Julio J Maldonado
*Assistant Examiner* — Quovaunda V Jefferson
(74) *Attorney, Agent, or Firm* — Hanley, Flight & Zimmerman, LLC

(57) ABSTRACT

A gaming apparatus comprises a movable symbol selector and a reference object. The symbol selector has a plurality of presentation portions. Each portion is associated with one or more symbols of a first set of symbols. The reference object comprises a plurality of parts over which the selector can be moved. Each part is associated with one or more symbols of a second set of symbols. When the symbol selector moves relative to the reference object at least one relationship is formed between at least one of the selector portions and at least one of the reference object parts. The at least one relationship is for use in determining a game outcome.

58 Claims, 8 Drawing Sheets

FOREIGN PATENT DOCUMENTS

| | | |
|---|---|---|
| GB | 427944 | 5/1935 |
| GB | 695988 | 8/1953 |
| GB | 1207311 | 9/1970 |
| GB | 1259571 | 1/1972 |
| GB | 1259572 | 1/1972 |
| JP | 10063208 | 3/1998 |
| JP | 11299948 | 11/1999 |
| JP | 2000084148 | 3/2000 |
| JP | 2000167219 | 6/2000 |
| JP | 2000217958 | 8/2000 |
| JP | 2001009081 | 1/2001 |
| JP | 2001178865 | 7/2001 |
| JP | 2001190725 | 7/2001 |
| JP | 2002065933 | 3/2002 |
| JP | 2004073511 | 3/2004 |
| JP | 2004105624 | 4/2004 |
| JP | 2006020815 | 1/2006 |
| KR | 20020079229 | 10/2002 |
| KR | 20040110824 | 12/2004 |
| WO | 9506299 | 3/1995 |
| WO | 9955437 | 11/1999 |
| WO | 2005094954 | 10/2005 |

* cited by examiner

Bet Table:
| PIC1 | PIC2 | PIC3 | PIC4 |
|---|---|---|---|
| 3 x PIC1 x5<br>4 x PIC2 x10<br>5 x PIC3 x30 | PAY TABLE | PAY TABLE | PAY TABLE |
| A | K | Q | J |
| PAY TABLE | PAY TABLE | PAY TABLE | PAY TABLE |
Fig. 9
Pay Scenario:
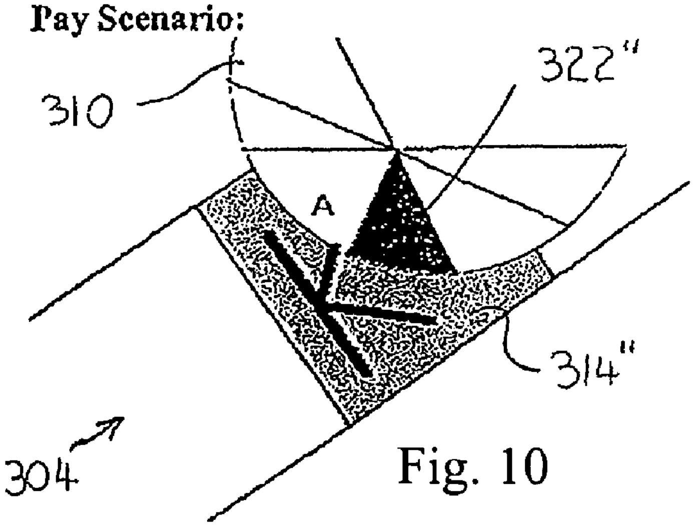
Fig. 10
No pay scenario:
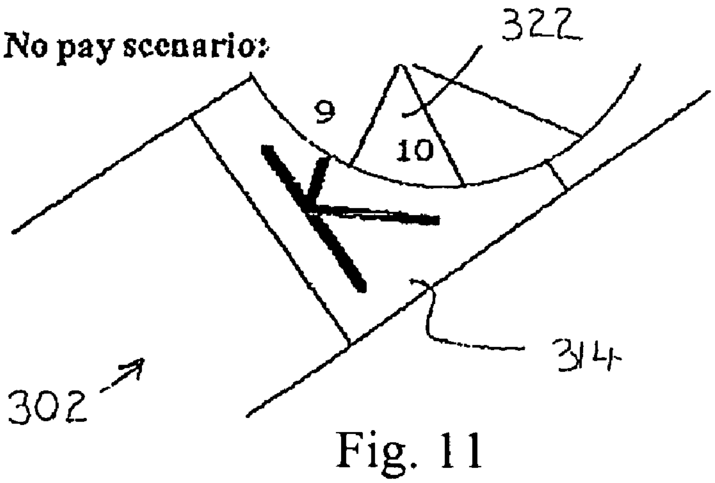
Fig. 11

GAMING SYSTEM AND A METHOD OF GAMING

CROSS-REFERENCE TO RELATED APPLICATIONS

The present application claims the benefit of priority to Australian Provisional Patent Application No. 2007907036, filed on Dec. 21, 2007, entitled "A GAMING SYSTEM AND A METHOD OF GAMING", which is herein incorporated by reference in its entirety.

FIELD OF THE INVENTION

The present invention relates to a gaming system and to a method of gaming.

BACKGROUND OF THE INVENTION

It is known to provide a gaming machine which comprises a plurality of reels, each of which spin about a common axis of rotation and have symbols located on their circumferential surface. Such gaming machines are played by activating the machine to rotate the reels. When the reels come to a stop the aligned symbols in a "pay line" determine the outcome of the game.

SUMMARY OF THE INVENTION

According to a first aspect of the present invention there is provided a gaming apparatus including:

a movable symbol selector having a plurality of presentation portions, wherein each portion is associated with one or more symbols of a first set of symbols; and a reference object including a plurality of parts over which the selector can be moved, wherein each part is associated with one or more symbols of a second set of symbols, wherein when the symbol selector moves relative to the reference object at least one relationship is formed between at least one of the selector portions and at least one of the reference object parts, wherein the at least one relationship is for use in determining a game outcome.

In an embodiment the respective symbols associated with each portion and part of each formed relationship are determined for use in determining the game outcome.

In an embodiment the portions are arranged over a surface of the selector.

In an embodiment the reference object includes one or more game surfaces. In an embodiment the or each game surface includes at least one of the parts.

In an embodiment the at least one relationship is formed by the at least one portion contacting at least one part.

In an embodiment selector is rollable and the movement of the selector is by rolling.

In one embodiment the parts of the reference object are spaced apart from each other. In an alternative embodiment the parts of the reference object are connected to each other.

In an embodiment the reference object has a single game surface, the game surface including the plurality of parts.

In an embodiment the reference object is stationary. In an alternative embodiment the reference object is movable.

In an embodiment the or each symbol associated with each portion is displayed in the portion. In an embodiment the or each symbol associated with each part is displayed in the part. A relationship between a portion and a part is regarded as a relationship between the respective symbols. In an embodiment a contact between a portion and a part is regarded as a contact between the respective symbols.

In an embodiment of symbol selector is a ball. In an embodiment the symbol selector is spherical in shape.

In an embodiment the symbol selector is one of a plurality of symbol selectors which are moved relative to the reference object. In an embodiment the symbol selector is one of a plurality of symbol selectors which are rolled over the game surface. Movement of each symbol selector relative to the reference object forms one or more relationships between respective at least one of the selector portions and at least one of the reference object parts, which are used in the game outcome.

In an embodiment the symbol selectors have the same symbols associated with their respective portions. In an alternate embodiment there is a different set of symbols for each symbol selector.

In an embodiment the symbol selectors have the same arrangement of symbols on their respective surfaces. In an alternative embodiment there is a different arrangement of symbols on each symbol selector.

In an embodiment the first set of symbols is the same as the second set of symbols. In an embodiment some of the first set of symbols are also in the second set of symbols. In an embodiment the first set of symbols is different to the second set of symbols.

In an embodiment the parts of the reference object are arranged in a lane.

In an embodiment the parts of the reference object are arranged into a plurality of lanes and a symbol selector is provided for each lane.

In an embodiment the symbols in each lane are the same. In an embodiment the sequence of symbols differs between lanes. In an embodiment the symbols differ between lanes.

In an embodiment the game surface is inclined and the symbol selector is released to roll down the game surface when the game is played.

In an embodiment the first set of symbols and the second set of symbols are faces of playing cards. In alternative embodiment the symbols are shapes, colours, letters, numbers or combinations of these.

In an embodiment the gaming apparatus is arranged to electronically simulate the symbol selectors and the reference object.

In an embodiment the gaming apparatus includes a monitor for determining which of the selector portions form a relationship with which of the reference object parts such that the symbols corresponding to the determined portions and parts can be determined.

In one arrangement, the gaming apparatus includes a comparator for comparing the determined symbols with game criteria to determine the game outcome.

In an embodiment the comparator is arranged to determine that the game outcome is a win in the event that one of more of the determined symbols of the selector is the same as one or more of the determined symbols of the reference object.

In an embodiment the comparator is arranged to determine the outcome of the game according to the number of determined selector symbols that are the same as the determined reference object symbols.

In an embodiment the comparator is arranged to determine that the outcome of the game is a win in the event that a combination of the related symbols indicate a win.

In an embodiment the comparator is arranged to determine that the outcome of the game is a loss in the event that none of related symbols are the same.

In an embodiment the comparator is arranged to determine that the outcome of the game is a loss in the event that a combination of the related symbols do not indicate a win.

In an embodiment the gaming apparatus includes a prize allocator for allocating a prize to a player of the game based on the game outcome.

In an embodiment the prize allocator allocates a prize having a quantum based on the number of related symbols that are the same.

The gaming apparatus may be arranged such that a player is able to choose to enter into another round of the game and thereby risk losing a prize or a portion of a prize, or to end the game and receive a prize won thus far.

The or each prize may be in the form of a monetary amount, points, tokens, progressive prizes, eligibility for feature games, tournament entitlements, or entitlements to inclusion of special symbols in subsequent rounds of the game, such as wildcard symbols.

In an embodiment the gaming apparatus further includes an indicator for indicating the determined symbols. In an embodiment the indicator indicates the determined selector symbols separately from the determined reference object symbols.

The gaming apparatus may be implemented as a stand alone gaming machine or across a network.

The gaming apparatus may form part of a gaming system.

According to a second aspect of the present invention there is provided a method of playing a game using the gaming apparatus including:

moving the symbol selector relative to the reference object;

determining which of the portions form a relationship with which of the parts and the corresponding symbols according to the at least one portion-part relationship;

determining a game outcome according the determined symbols.

In an embodiment the outcome of the game is a win in the event that the one or more of the related symbols are the same.

In an embodiment a quantum of the outcome the game is based on the number of related symbols that are the same.

In an embodiment a quantum of the outcome the game is based on which selector symbols are related to which reference object symbols.

According to a third aspect of the present invention there is provided a game controller for controlling a gaming system, the gaming system including:

a movable symbol selector having a plurality of presentation portions, wherein each portion is associated with one or more symbols of a first set of symbols, and a reference object including a plurality of parts over which the movable object can be moved, wherein each part is associated with one or more symbols of a second set of symbols;

wherein the game controller is arranged to cause:

the movable object to move relative to the reference object so that at least one relationship is formed between at least one of the selector portions and at least one of the reference object parts;

wherein the at least one relationship is for use in determining a game outcome.

In an embodiment the game controller is arranged to determine the respective symbols associated with each portion and part of each formed relationship for use in determining the outcome of the game.

In an embodiment the gaming system includes a display for displaying of the movable symbol selector and the reference object.

In an embodiment the game controller includes a processor configured to control the display.

In an embodiment the processor is configured to control the display to separately display the determined symbols.

In an embodiment the processor is configured to operate a symbol selection component which determines the movement or movements of the movable object so that when the symbol selector is moved the at least one relationships are formed according to the determined movement or movements.

According to a fourth aspect of the present invention there is provided a method of playing a game using the game controller including:

displaying moving of the symbol selector over the reference object;

determining the game outcome according the determined symbols.

According to a fifth aspect of the present invention there is provided a method of playing a game including:

moving a symbol selector over a reference object, wherein the symbol selector has a plurality of presentation portions, wherein each portion is associated with one or more symbols of a first set of symbols, wherein the reference object has a plurality of parts over which the selector can move, wherein each part is associated with one or more symbols of a second set of symbols, wherein when the symbol selector moves relative to the reference object at least one of the portions will form at least one relationship with at least one of the parts;

determining a game outcome according to the formed relationships.

In an embodiment the method includes determining which of the portions form a relationship with which of the parts and which respective symbols are associated with each part of the formed relationships, and determining the game outcome based on the determined symbols.

According to a sixth aspect of the present invention there is provided logic embodied in a machine readable form for controlling a processor to perform a method of playing a game including instructions for controlling the processor to:

display a moveable symbol selector having a plurality of presentation portions, wherein each portion is associated with one or more symbols of a first set of symbols;

display a reference object including a plurality of parts over which the selector can move, wherein each part is associated with one or more symbols of a second set of symbols;

display the symbol selector moving relative to the reference object with at least one of the portions forming at least one relationship with at least one of the parts;

wherein the at least one relationship is for use in determining a game outcome.

In an embodiment the instructions are further configured to determine which of the portions form a relationship with which of the parts and which respective symbols are associated with each part of the formed relationships for use in determining the game outcome.

In an embodiment the logic is embodied in a computer program including instructions which when executed control the operation of the processor.

In an embodiment the logic is embodied in a data signal.

BRIEF DESCRIPTION OF THE DRAWINGS

Certain embodiments of the present invention will now be described, by way of example only, with reference to the accompanying drawings, in which:

FIG. 9 is a diagrammatic representation of a bet pay table used to determine a prize based on an outcome of the game played using the gaming system of FIG. 6 according to an embodiment of the present invention;

FIG. 10 is a schematic representation of a matching scenario using the gaming system of FIG. 6;

FIG. 11 is a schematic representation of a non-matching scenario using the gaming system of FIG. 6;

Figure 1:
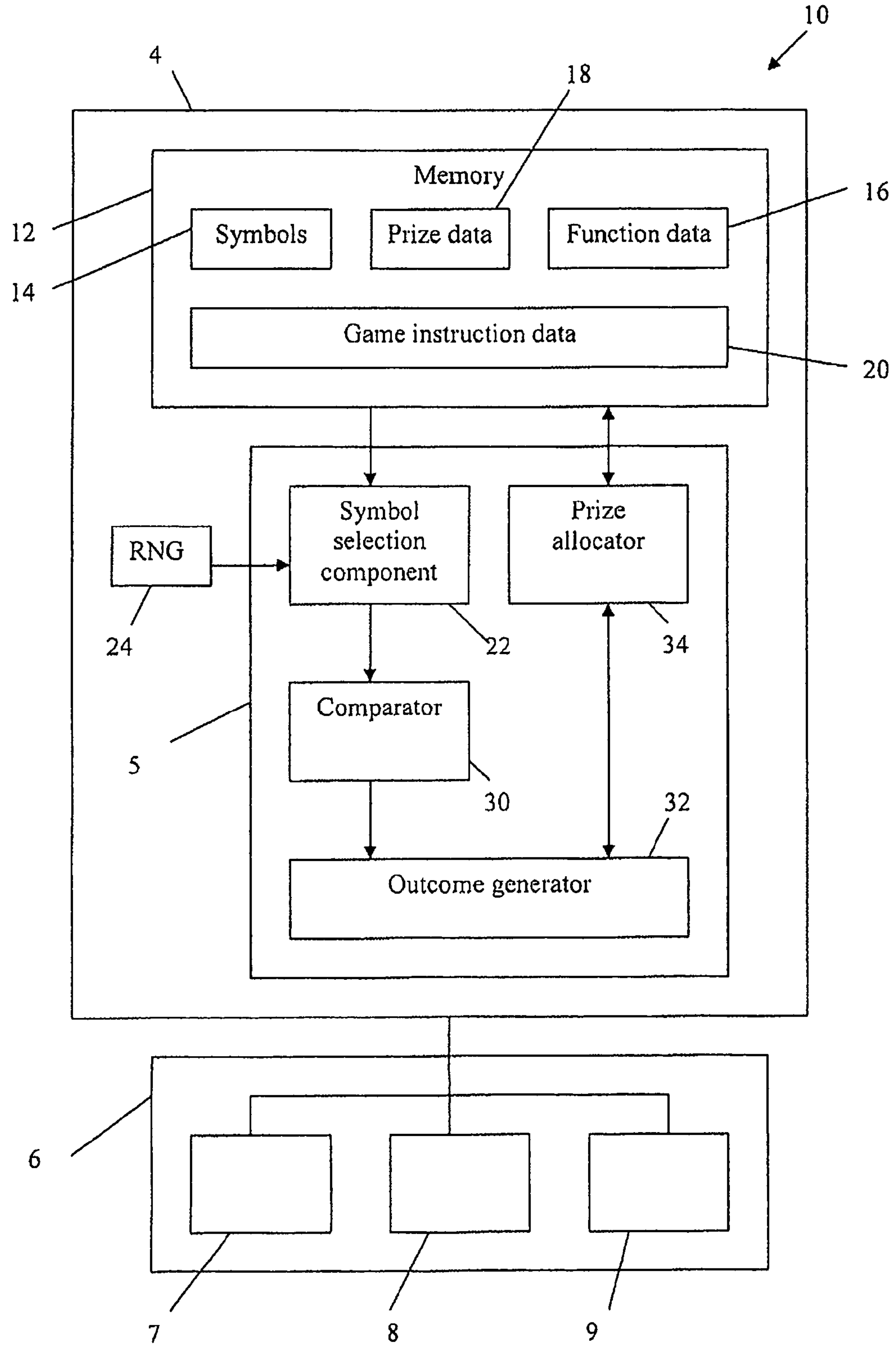
FIG. 1 is a diagrammatic block diagram of a gaming system in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DESCRIPTION OF CERTAIN EMBODIMENTS

Referring to the drawings, there is shown a gaming system arranged to implement a probabilistic wagering game wherein a player wagers a bet amount and a prize is allocated to the player depending on a game result.

The game implemented by the gaming system operates such that a player places a bet on a game outcome and will be awarded a prize according to the result of the game and in some embodiments according to the amount wagered.

The gaming system includes a gaming apparatus including a moveable symbol selector, such as a ball, and a reference object such as a game surface. The symbol selector has a plurality of presentation portions over the selector surface. Each portion is associated with one or more symbols of a first set of symbols. Typically the symbol associated with the portion is displayed in the portion. Therefore the first symbols are arranged over a surface of the selector. In another embodiment the symbol selector has a plurality of edges that form the presentation portions. In an embodiment the reference object has a plurality of game surfaces, such as platforms. The selector and/or the reference object may be 2 dimensional or 3 dimensional.

The game surface is for the symbol selector to move relative to. The game surface has a plurality of parts arranged over the game surface. Each part is associated with one or more symbols of a second set of symbols. The symbols associated with each part are typically displayed in the part. When the symbol selector moves relative to the game surface at least some of the selector portions will form a relationship with at least some of the game surface parts, such as by rolling, bouncing, flipping etc. Typically the relationship is formed by a contact between a portion and a part, however other methods of forming the relationship are contemplated. By association at least some of the selector symbols are regarded as forming a relationship with at least some of the game surface symbols.

In the example embodiment, to play the game the ball is intended to be rolled over the game surface and depending on which selector portions contact which game surface parts at least some of the selector symbols and at least some of the game surface symbols will be regarded as making contact with each other. The contact of the respective symbols with each other can be monitored and used to determine the outcome of the game.

The outcome of the game is determined according to the rules of the specific implementation of the game and the related symbols. A typical rule is to determine if the related selector symbol and game surface symbol are the same, that is they match. In the event that they match, then the symbol is used in the game outcome, and if they are not, then the related symbols are not used any further. In a variation of this rule, if a quality of the symbol is the same then the quality may be used in the game outcome. For example if the symbols are of playing cards, then the quality may be the rank of the card or the suit of the card (eg Kings or clubs). Another variation of the game rules would combine the related symbols for use in the game outcome. For example if the symbols were numbers, the combined result of the related symbols may be used (e.g., the selector symbol is a 4 and the game surface symbol is a 3, then the combined result used in the game outcome is a 7). Other implementations are possible.

A monitoring component can be used to determine which of the selector symbols forms a relationship with which of the reference object symbols.

In relation to the player's wager the outcome can be a success, a loss, or a neutral outcome, which will depend on the specific implementation of the game. A successful outcome will result in winning of a prize. A loss will result in no prize and loss of the wager. A neutral outcome will be no awarded prize, but no loss of the wager amount. In this case, another round of the gamer can therefore be played without making a further wager.

The symbols may take any suitable form such as representations of dice, cards, dominoes, tiles, shapes, numbers, letters, currency amounts or any other type of symbols. The symbols may have an associated ranking or a ranking can be applied so that a comparison of other symbol(s) with the selected pairs of symbols yields a success or failure result. The ranking may be fixed or may vary according to a schedule, such as in the game "scissors, paper, rock".

In one example, the symbols are currency amounts and success is determined on the basis of the currency amounts in each selected pair of related symbols that match. In one implementation the quantum of the prize won is determined by the value of the amounts of the related symbols.

In an alternative example, the selected pair(s) of related symbols are compared to reference symbols and success is determined on the basis of a comparison with the reference symbols. For example, the symbols are numbers, if the sum of the numbers shown on the selected pairs is greater than or equal to the sum of the numbers shown on the reference numbers, the player wins.

The sets of symbols may include numbers, letters, one or more colours, or at least one special symbol or colour having an allocated special function or prize.

The game may be multi-levelled, where successive rounds are played and depending on the success or otherwise, in each round, the game may progress through the levels.

More than one symbol selector and or playing surface may be used. The number of these may be constant or may vary according to game rules, for example the number of selectors may increase or decrease with each succeeding game level. The selectors or game surface(s) used may include the same symbols or may have different combinations of symbols in different rounds.

The symbols may include standard symbols and may additionally include one or more function symbols, and the ranking associated with a symbol or combination of symbols may be determined on the basis of the displayed standard symbols and the function associated with any displayed function symbol. The function associated with a function symbol may be for example a wild function wherein display of the function symbol is treated during consideration of the game outcome as any of the standard symbols or as a predetermined function selected by the gaming system on commencement of the game.

The game may be played using a physical implementation or an electronic simulated implementation. In the physical implementation the selector(s) and reference object are physical objects. In the simulated implementation the selector(s) and reference object are displayed on a display.

The game may be a secondary game in which the game is used to determine a secondary or bonus prize of another game.

The game may be implemented as part of another game, wherein the game is activated as a result of any predetermined action, such as a game outcome related event, an operator initiated event, a random event, an event related to turnover, or an event related to special bets being placed.

Referring to FIG. 1, a gaming system 10 for implementing an electronic embodiment of the game is shown in diagrammatic form. The gaming system 10 includes a player interface 6 and a game controller 4. The player interface 6 is arranged to enable interaction between a player and the gaming system and for this purpose includes input/output components for the player to enter instructions and play the game.

Components of the player interface 6 may vary but will typically include a credit mechanism 7 to enable a player to input credits and receive payouts, one or more displays 8 which may include a touch screen, and a game play mechanism 9 arranged to enable a player to input game play instructions.

The game controller 4 is in data communication with the player interface 6 and typically includes a processor 5 arranged to process game play instructions and output game player outcomes to the display 8. Typically, the game play instructions are stored as program code in a memory 12 that can also be hardwired. It will be understood that in this specification the term "processor" is used to refer generically to any device that can process game play instructions and may include a microprocessor, microcontroller, programmable logic device or any other computational device such as a personal computer or a server.

The memory 12 arranged to store symbols data 14 indicative of a plurality of symbols for selection and display to a player during a game, function data 16 indicative of one or more functions associated with one or more of the symbols, prize data 18 indicative of prize amounts of the game, and game instruction data 20 indicative of game instructions usable by the gaming machine 10 to control operation of the game.

The game controller 4 also includes a symbol selection component 22 which is arranged to implement the moving (e.g. rolling) of the selector(s) relative to (e.g. over) the game surface. In one implementation the symbol selection component 22 includes a symbol selector, such as a ball, and a reference object such as a game surface. In this example a monitoring component may for part of the symbol selection component 22 so that the related symbols can be determined. In another implementation the symbol selector and reference object are simulated. In this example the symbol selection component 22 uses a random number generator 24 to determine which symbols of the symbol selector form a relationship with (e.g. such as by making contact) which symbols of the reference object.

It will be appreciated that the random number generator 24 may be of a type which is arranged to generate pseudo random numbers based on a seed number, and that in this specification the term "random" will be understood accordingly to mean truly random or pseudo random.

The game controller 4 also includes a comparator 30 arranged to compare the related symbols in accordance with the game instruction data 20, and an outcome generator 32 which in accordance with the game instruction data 20 determines whether the player is successful or unsuccessful and therefore wins a prize or not.

While in this example the comparator 30 and the outcome generator 32 are shown as separate components, it will be understood that the functions of the outcome generator 32 and the comparator 30 may be implemented by one component.

The game controller 4 also includes a prize allocator 34 which communicates with the prize data 18 stored in the memory 12 and with the outcome generator 30, and determines an appropriate prize to allocate to a player depending on the outcome of the game and in some embodiments depending on the related symbols selected by the symbol selector 22.

Additional prizes may be allocated on the basis of occurrence of a predetermined combination, such as for example the same symbol in one or more of the pairs, a consecutive sequence in or between the pairs, occurrence of all odd or all even numbers, occurrence of the same symbol combination, a predetermined sequence in consecutive turns, and so on. The additional prizes may take the form of one or more additional turns.

The gaming system 10 may also be arranged such that a player has the option of choosing to continue with another round of the game and thereby attempt to wager the winnings of the previous round or to win a game in which the results of subsequent rounds determines he outcome of the game.

Instead of providing monetary prize amounts, the prize allocated to a player for reaching a level and/or any additional prize may be in the form of points, tokens, progressive prizes, eligibility for feature games, tournament entitlements, or special symbol entitlements in other games, such as an additional wild symbol for a predetermined number of games.

In the embodiment described below, the symbol selection component 22, the comparator 30, the prize allocator 34 and the outcome generator 30 are implemented using the processor and associated programs, although it will be understood that other implementations are envisaged.

The gaming system 10 can take a number of different forms.

In a first form, a stand alone gaming machine is provided wherein all or most components for implementing the game are present in a player operable gaming machine.

In a second form, a distributed architecture is provided wherein some of the components for implementing the game are present in a player operable gaming machine and some of the components for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 2:
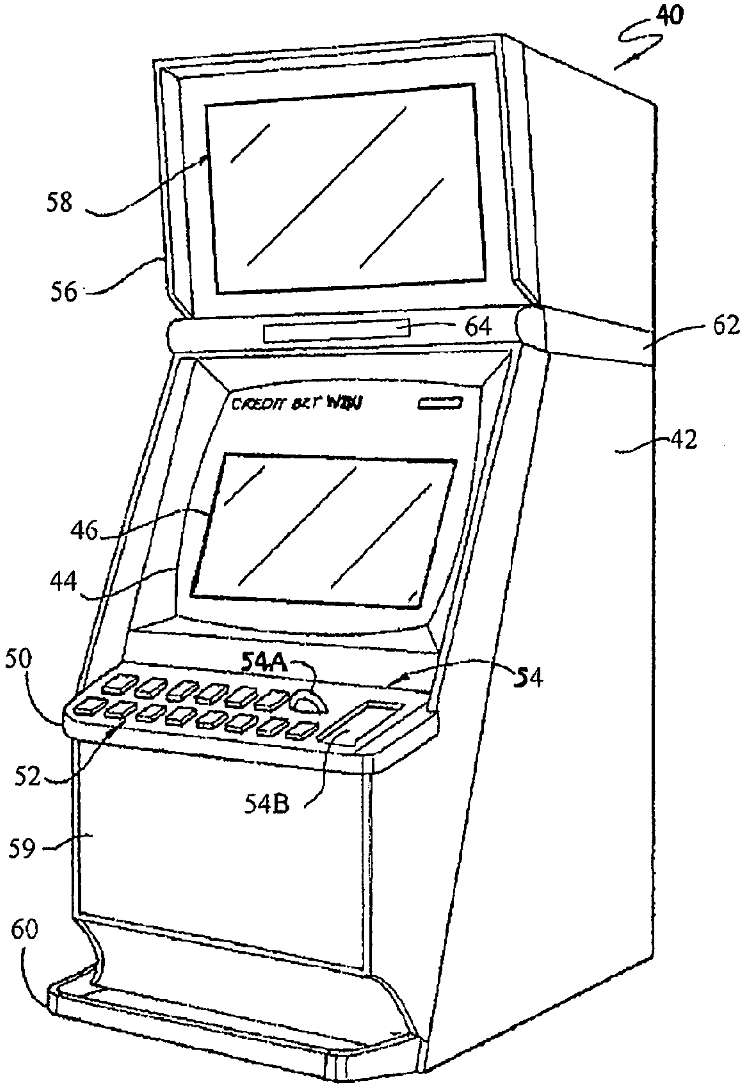
FIG. 2 is a diagrammatic representation of a gaming system in accordance with an embodiment of the present invention with the gaming system implemented in the form of a stand alone gaming machine.

A gaming system in the form of a stand alone gaming machine 40 is illustrated in FIG. 2. The gaming machine 40 includes a console 42 having a display 44 on which is displayed representations of a game 46 that can be played by a player. A mid-trim 50 of the gaming machine 40 houses a bank of buttons 52 for enabling a player to interact with the gaming machine during gameplay, including enabling the player to select the bet amount and to receive other inputs. The mid-trim 50 also houses a credit input mechanism 54 which in this example includes a coin input chute 54A and a bill collector 54B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

A top box 56 may carry artwork 58, including for example pay tables and details of bonus awards and other information or images relating to the game. Further artwork and/or information may be provided on a front panel 59 of the console 42. A coin tray 60 is mounted beneath the front panel 59 for dispensing cash payouts from the gaming machine 30.

The display 44 is in the form of a video display unit, particularly a cathode ray tube screen device. Alternatively, the display 44 may be a liquid crystal display, plasma screen, any other suitable video display unit. The top box 56 may also include a display, for example a video display unit, which may be of the same type as the display 44, or of a different type. The display may include a touch screen usable by a player to interact with the gaming machine, in particular during game play.

The display 44 in this example is arranged to display representations of the selector and game surface, each of which has several associated symbols. Typically 2, 3, 4 or 5 selectors are provided, which each selector rolling over a respective lane of the game surface.

A player marketing module (PMM) 62 having a display 64 is connected to the gaming machine 10. The main purpose of the PMM 62 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 62 is a Sentinel III device produced by Aristocrat Technologies Pty Ltd.

Figure 3:
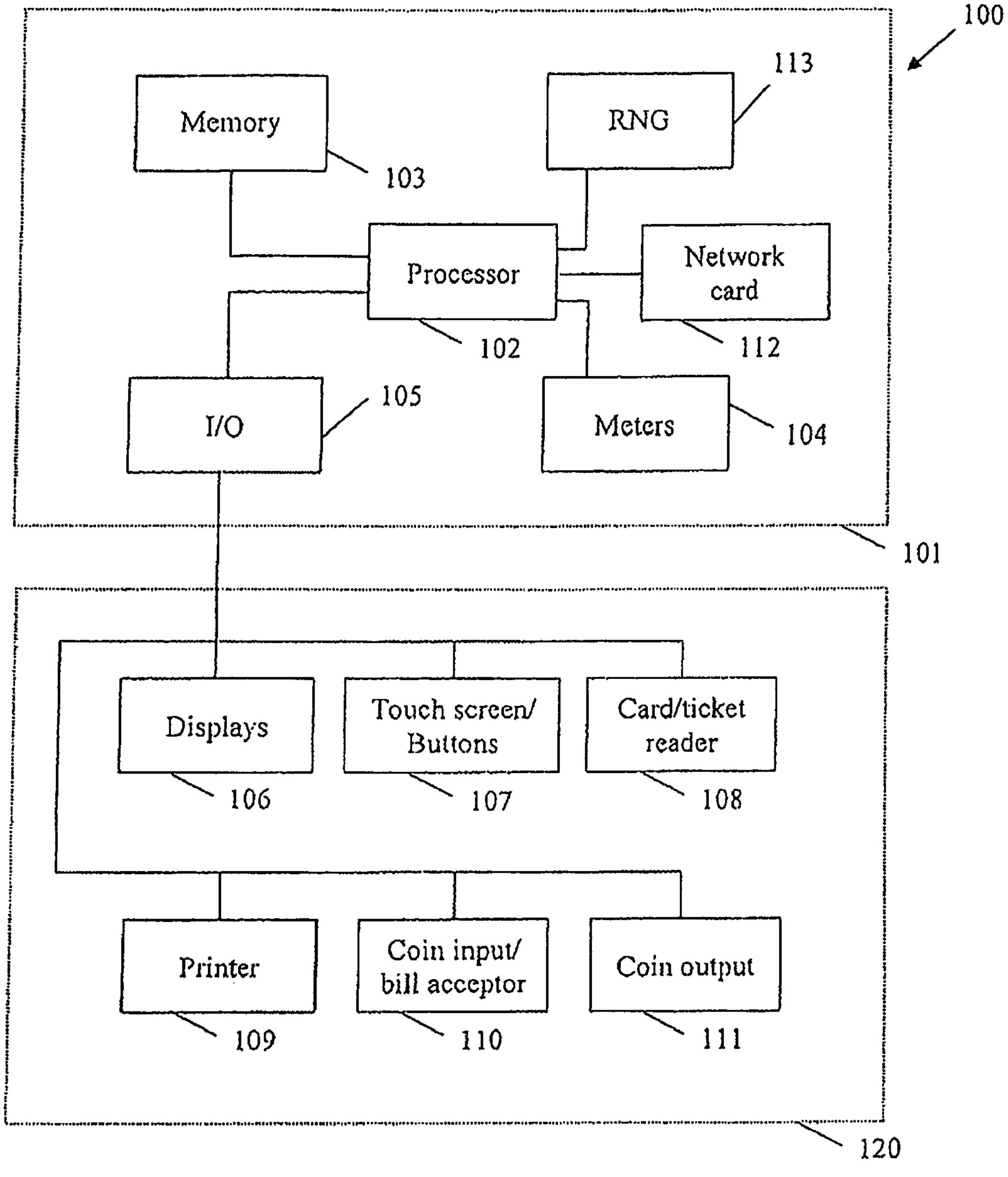
FIG. 3 is a schematic block diagram of operative components of the gaming machine shown in FIG. 2.

FIG. 3 shows a block diagram of operative components of a typical gaming machine 100 which may be the same as or different to the gaming machine shown in FIG. 2.

The gaming machine 100 includes a game controller 101 having a processor 102. Instructions and data to control operation of the processor 102 in accordance with the present invention are stored in a memory 103 which is in data communication with the processor 102.

Typically, the gaming machine 100 will include both volatile and non-volatile memory and more than one of each type of memory, with such memories being collectively represented by the memory 103.

Figure 4:
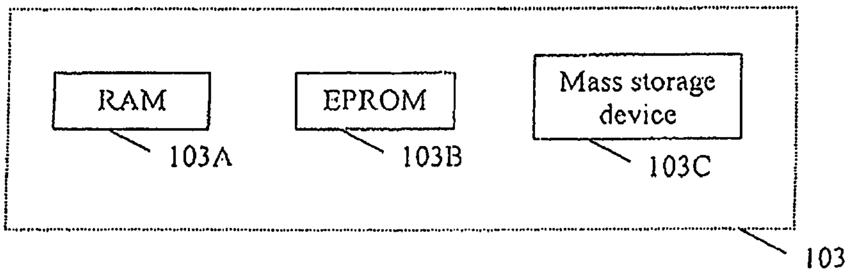
FIG. 4 is a schematic block diagram of components of a memory of the gaming machine shown in FIG. 2.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere, and data indicative of symbols, prize amounts and symbol functions used in the game.

The gaming machine has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 3, the peripheral devices that communicate with the game controller 101 include one or more displays 106, a touch screen and/or bank of buttons 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106,107,108,109,110,111 may be provided remotely from the game controller 101.

The gaming system may include a network, which for example may be an Ethernet network, a LAN or a WAN. In this example, banks of two gaming machines are connected to the network.

Figure 5:
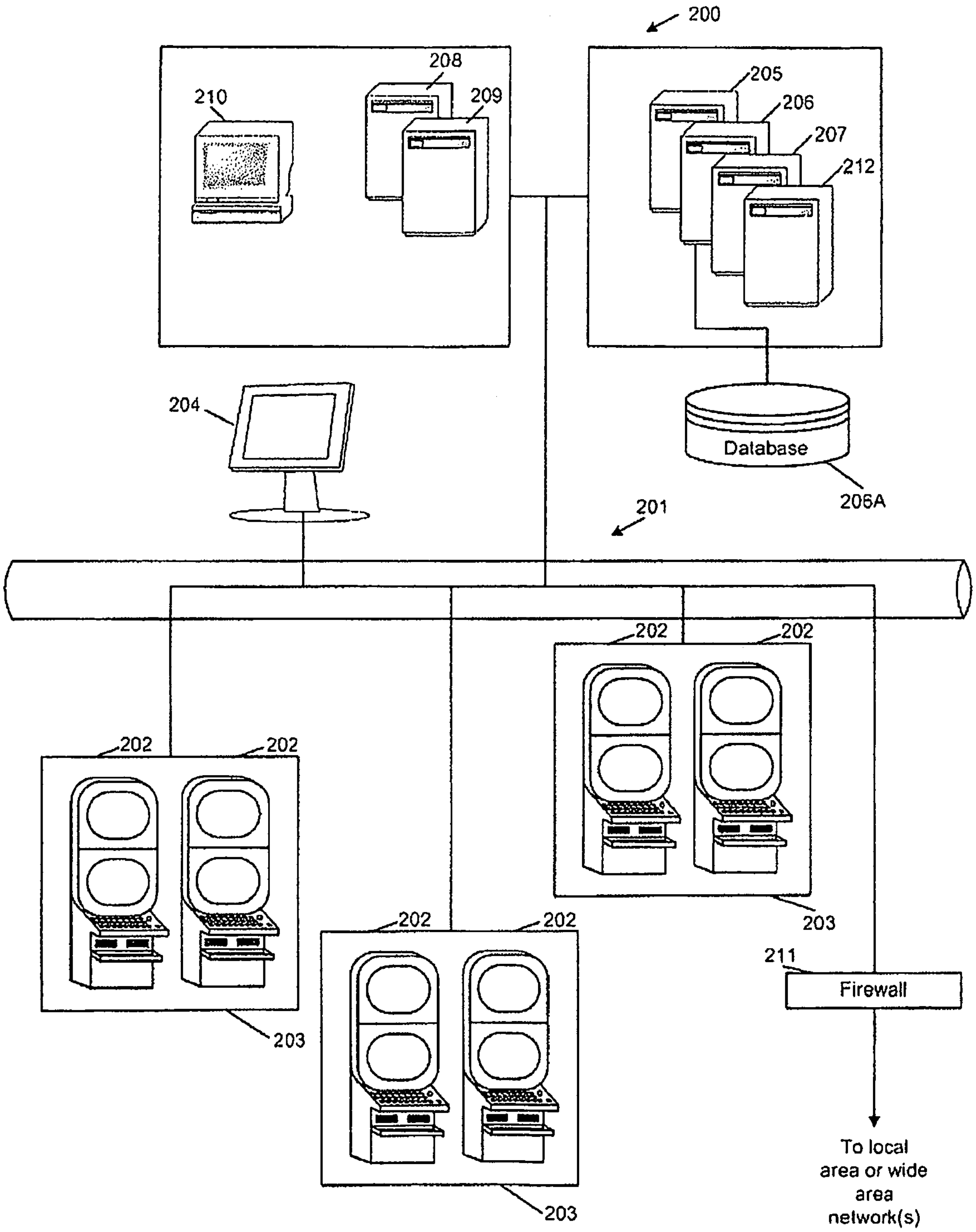
FIG. 5 is a schematic diagram of a gaming system in accordance with an alternative embodiment of the present invention with the gaming system implemented over a network.
Figure 6:
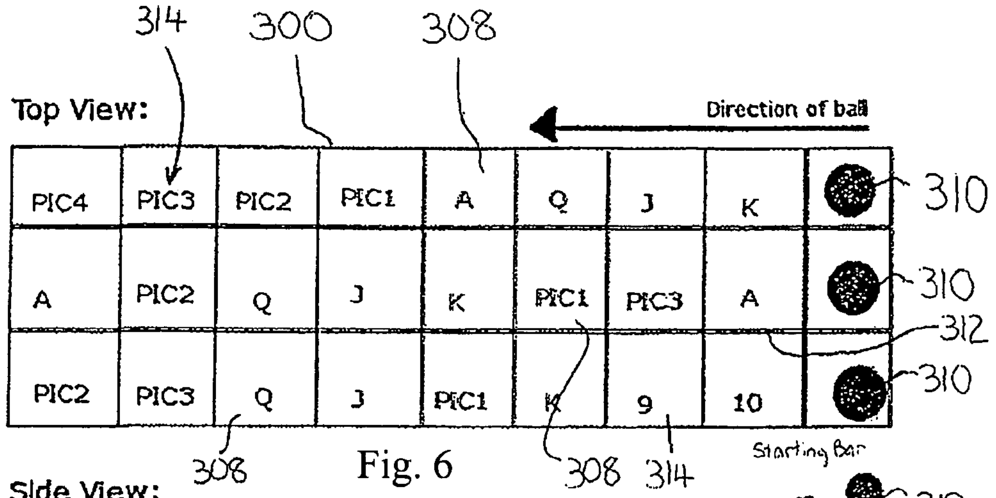
FIG. 6 is a schematic plan view of a gaming system according to an embodiment of the present invention.

FIG. 5 shows a gaming system 200 in accordance with an alternative embodiment. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

The gaming system 200 may also include a loyalty program server 212.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided.

During operation, the game controller, whether implemented in a stand alone gaming machine 10, 100 or over a network 201, implements a probabilistic wagering game wherein a prize is allocated to a player based on the game outcome.

An example of a specific implementation of the gaming system will now be described in relation to a stand alone gaming machine 40, 100, although it will be understood that implementation may also be carried out using other gaming system architectures such as a network architecture such as one of the type shown in FIG. 5.

In the present embodiment, the gaming system 10 is arranged to display virtual symbols using a video graphical display device, although it will be understood that other arrangements are envisaged.

Figure 7:
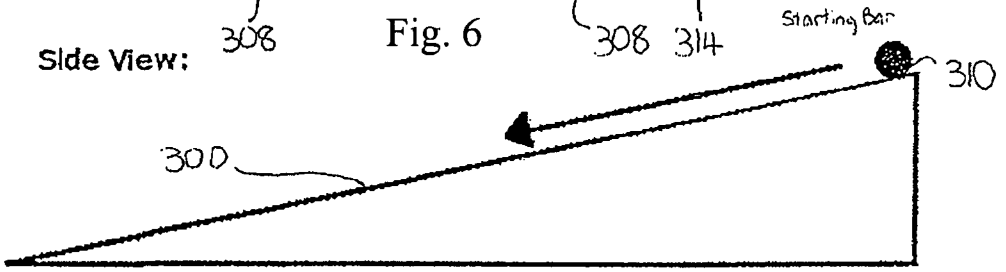
FIG. 7 is a schematic side elevation of the gaming system of FIG. 6.
Figure 8:
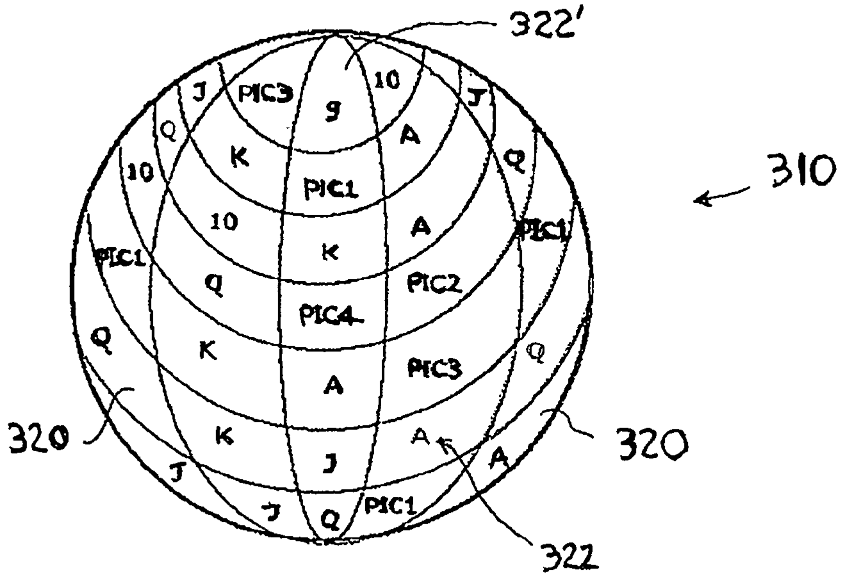
FIG. 8 is a schematic representation of a ball of the gaming system of FIG. 6.

Referring the FIGS. 6 to 8, 10 and 11, an embodiment of the game is explained in more detail. A game apparatus includes a game surface 300 and one or more symbol selectors. In this embodiment the symbol selectors are balls 310, although other moveable objects could be used. In this example the reference object is a game surface 300 that has three lanes 302, 304, and 306. Each lane is sequentially divided into parts 308, with each part 308 having a symbol 314 displayed thereon. The game surface 300 is sloped as seen in FIG. 7 so that the balls 310 roll down the slope (from right to left in FIGS. 6 and 7). One ball 310 is allocated to each lane 302, 304 and 306. As each ball rolls down the respective lane its surface will contact the parts 308 in turn. The lanes may have a divider 312 between them to prevent the balls from straying from their respective lane.

Each ball 310 has its spherical surface divided into a plurality of surface portions 320, for example 20 to 200 surface portions, more typically about 50. Each of the surface portions 320 has a symbol 322 allocated thereto. In one example there are 52 surface portions, with each surface portion representing one card of a standard desk of playing cards.

The balls 310 are of a diameter relative to the length of each part such that one, two or relatively few, say up to 6, of the surface portions 320 can contact the parts 308 as the ball rolls over them.

In a physical implementation, each ball 310 is formed of a suitable material, such as plastics or metal and has the symbols marked on its surface (such as by printing or etching). The balls 310 may be released for rolling down the lanes 302, 304 and 306 by the player, by another person (such as a croupier) or by a motorized release mechanism. The balls may be given an impetus to commence rolling by for example a flipper, plunger or launcher.

The game machine has a monitor which determines which of the surface portions 320 contact which of the parts 308 as each ball rolls down the surface. This in turn is used to determine which symbols 322 on each ball 310 contact which symbols 314 on the game surface 300. This is used to determine the outcome of the game.

The monitor can take various forms. If the apparatus takes a physical form, then the monitor may include an optical sensor in each part which detects the presence of the ball and senses which surface portion is making contact. The monitor may include a camera based image recognition system. The monitor may use magnetic, inductance or RFID sensing.

In a simulated implementation the balls may be rolled upon completion of a player placing a bet. In this implementation rolling of the balls may be modelled, or the relationships may be randomly determined and the position of the balls calculated based on the determined relationships. Alternatively the speed and direction of movement of the balls may be randomised. One or more of the balls may be animated to move in some other manner in addition to rotation.

Figure 13:
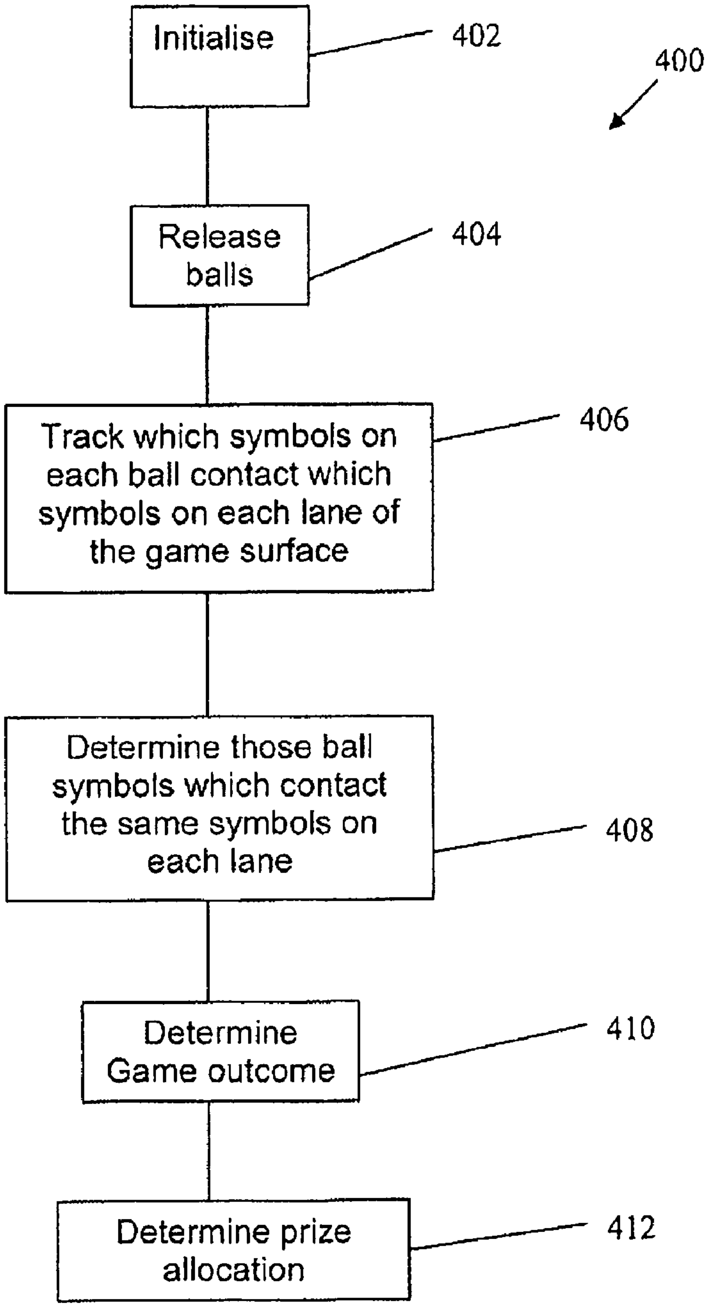
FIG. 13 is a flow diagram illustrating a method of determining a prize allocation in accordance with an embodiment to the present invention.

FIG. 13 shows a method 400 of playing the game performed by the gaming system 10 with reference to the example embodiment described in relation to FIGS. 6 to 8, 10 and 11. The game is initialized 402. Initialization may for example involve placing the balls at the top of the sloped surface, with one ball in each lane. Initialization may also include taking a wager on the outcome of the game, play of a precursor game or some other preliminary step.

Next the balls 310 are released 404 so that they roll down the sloped surface in each lane 304. The comparator 30 tracks 406 which symbols 322 on the ball 310 make contact with each of the symbols 314 on the surface of each lane 306. The comparator 30 also determines 408 if the symbols 322 on the ball 310 that contact each of the symbols 314 of each lane 302 match. This will produce a set of symbols for each lane 302 where the symbol 322' on the ball 310 contacted its matching symbol 314' (in this case a ‘9’) on the lane 302, 304, 306. From this the outcome generator 32 determines 410 the outcome of the game. The prize allocator 34 determines 412 the prize allocation according to the game outcome and typically the wager(s) on the outcome of the game.

FIG. 10 schematically shows matching of portion 322" to part 314". In this case, part 314" has a King symbol and portion 322" also has a King symbol. As can be seen portion 322" contacts part 314", and thus the King in portion 322" is regarded as contacting the King in 314".

FIG. 11 schematically shows a miss matching of portion 322 to part 314. In this case, part 314 has a King symbol and portion 322 has a ‘10’ symbol. As can be seen, portion 322 contacts part 314, however, the symbol in portion 322 does not match the symbol in part 314. Therefore while the ‘10’ is determined to contact the King, the rules of the game result in this portion-part contact not being used any further to determine the result of the game.

Figure 12:
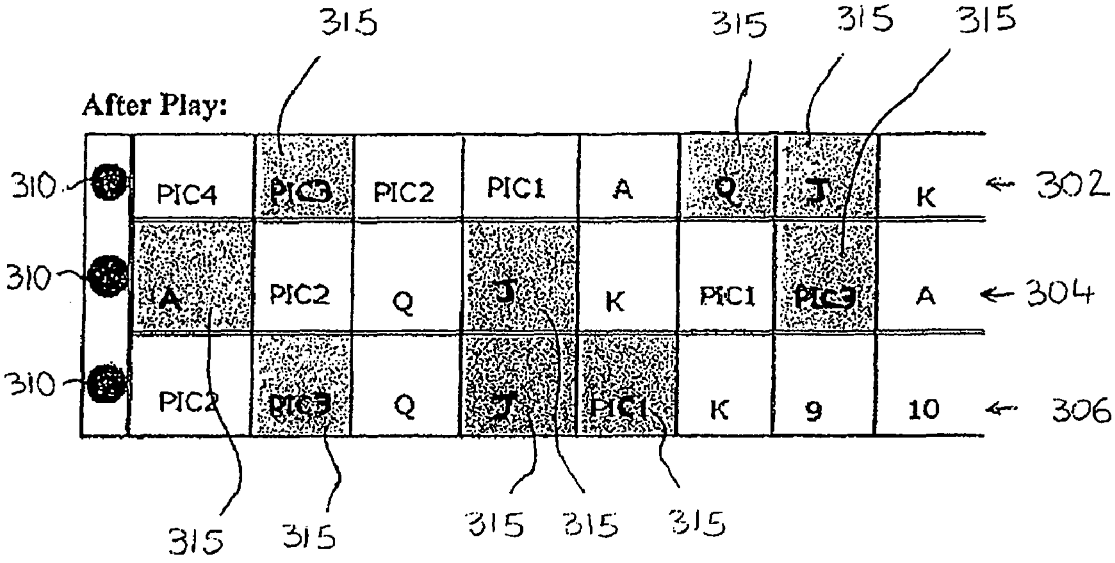
FIG. 12 is a schematic representation of the gaming system of FIG. 6 after the game has been played, in which matching symbols are highlighted.

FIG. 12 shows an example of an outcome of the game, where the three balls 310 have each rolled down their respective lane 302, 304 and 306. During the course of rolling down these respective lanes, the portion-part contacts have been monitored. In those cases where the symbol of the portion-part contact matched the part has been highlighted, such as by back lighting the surface of the part. The highlighted parts are indicated as 315.

It can be seen from FIG. 12 that a total of 3 PIC3, 1 PIC3, 3 Js, 1 Q and 1 A are highlighted. These results can then be used to determine payout winnings by for example using a betting table. FIG. 9 shows example of a betting table, where for example, if 3×PIC1 are lit, the payout is five times the amount bet. If 4×PIC2 are lit the payout is 10 times the amount bet. If 5 PIC3 is lit the payout is 30 times the amount bet. Various other combinations of betting results can be determined and placed in the betting table.

It is noted that ball might not be spherical. The surface areas or portions may not be uniform. Some or all of the symbols may repeat in the portions or in the parts. The size of each part may not be uniform. The parts may not have the same symbols. The parts are generally greater in area than the area of the portions. However, in an alternative embodiment the portions may be greater in area than the parts.

Modifications and variations as be apparent to a skilled addressee are deemed to be within the scope of the present invention.

It is to be understood that, if any prior art publication is referred to herein, such reference does not constitute an admission that the publication forms a part of the common general knowledge in the art in any country.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A gaming apparatus comprising:

a movable symbol selector having a plurality of presentation portions, wherein each portion is associated with one or more symbols of a first set of symbols;

a reference object comprising a plurality of parts over which the selector can be moved, wherein each part is associated with one or more symbols of a second set of symbols, wherein when the symbol selector moves relative to the reference object at least one relationship is formed between at least one of the selector portions and at least one of the reference object parts; wherein the at least one relationship is for use in a determining a game outcome; and wherein some of the first set of symbols are also in the second set of symbols.

2. A gaming apparatus according to claim 1, wherein the portions are arranged over a surface of the selector.

3. A gaming apparatus according to claim 1, wherein the reference object comprises one or more game surfaces.

4. A gaming apparatus according to claim 3, wherein the or each game surface comprises at least one of the parts.

5. A gaming apparatus according to claim 1, wherein the at least one relationship is formed by the at least one portion contacting at least one part.

6. A gaming apparatus according to claim 1, wherein the selector is rollable and the movement of the selector is by rolling.

7. A gaming apparatus according to claim 1, wherein the parts of the reference object are spaced apart from each other.

8. A gaming apparatus according to claim 7, wherein the game surface is inclined and the symbol selector is released to roll down the game surface when the game is played.

9. A gaming apparatus according to claim 1, wherein the parts of the reference object are connected to each other.

10. A gaming apparatus according to claim 1, wherein the reference object is stationary.

11. A gaming apparatus according to claim 1, wherein the reference object is movable.

12. A gaming apparatus according to claim 1, wherein the or each symbol associated with each portion is displayed in the portion.

13. A gaming apparatus according to claim 1, wherein the or each symbol associated with each part is displayed in the part.

14. A gaming apparatus according to claim 1, wherein of symbol selector is a ball.

15. A gaming apparatus according to claim 1, wherein the symbol selector is one of a plurality of symbol selectors which are moved relative to the reference object.

16. A gaming apparatus according to claim 15, wherein the symbol selectors have the same symbols associated with their respective portions.

17. A gaming apparatus according to claim 15, wherein there is a different set of symbols for each symbol selector.

18. A gaming apparatus according to claim 15, wherein the symbol selectors have the same arrangement of symbols on their respective surfaces.

19. A gaming apparatus according to claim 15, wherein there is a different arrangement of symbols on each symbol selector.

20. A gaming apparatus according to claim 1, wherein the first set of symbols is the same as the second set of symbols.

21. A gaming apparatus according to claim 1, wherein the first set of symbols is different to the second set of symbols.

22. A gaming apparatus according to claim 1, wherein the parts of the reference object are arranged in a lane of sequential parts.

23. A gaming apparatus according to claim 1, wherein the parts of the reference object are arranged into a plurality of lanes and a symbol selector is provided for each lane.

24. A gaming apparatus according to claim 23, wherein the symbols in each lane are the same.

25. A gaming apparatus according to claim 23, wherein the sequence of symbols differs between lanes.

26. A gaming apparatus according to claim 23, wherein the symbols differ between lanes.

27. A gaming apparatus according to claim 1, wherein the first set of symbols and the second set of symbols are faces of playing cards.

28. A gaming apparatus according to claim 1, wherein the symbols are shapes, colours, letters, numbers or combinations of these.

29. A gaming apparatus according to claim 1, wherein the gaming apparatus is arranged to electronically simulate the symbol selector and the reference object.

30. A gaming apparatus according to claim 1, further comprising a monitor for determining which of the selector portions form a relationship with which of the reference object parts such that the symbols corresponding to the determined portions and parts can be determined.

31. A gaming apparatus according to claim 30, wherein the gaming apparatus comprises a comparator for comparing the determined symbols with game criteria to determine the game outcome.

32. A gaming apparatus according to claim 31, wherein the comparator is arranged to determine that the game outcome is a win in the event that one of more of the determined symbols of the selector is the same as one or more of the determined symbols of the reference object.

33. A gaming apparatus according to claim 32, wherein the comparator is arranged to determine the outcome of the game according to the number of determined selector symbols that are the same as the determined reference object symbols.

34. A gaming apparatus according to claim 32, wherein the comparator is arranged to determine that the outcome of the game is a win in the event that a combination of the determined symbols indicate a win.

35. A gaming apparatus according to claim 32, wherein the comparator is arranged to determine that the outcome of the game is a loss in the event that none of determined symbols are the same.

36. A gaming apparatus according to claim 32, wherein the comparator is arranged to determine that the outcome of the game is a loss in the event that a combination of the determined symbols do not indicate a win.

37. A gaming apparatus according to claim 30, further comprising an indicator for indicating the determined symbols.

38. A gaming apparatus according to claim 37, wherein the indicator indicates the determined selector symbols separately from the determined reference object symbols.

39. A gaming apparatus according to claim 1, wherein the gaming apparatus comprises a prize allocator for allocating a prize to a player of the game based on the game outcome.

40. A gaming apparatus according to claim 39, wherein the prize allocator allocates a prize having a quantum based on the number of determined symbols that are the same.

41. A gaming apparatus according to claim 39, wherein the or each prize may be in the form of a monetary amount, points, tokens, progressive prizes, eligibility for feature games, tournament entitlements, or entitlements to inclusion of special symbols in subsequent rounds of the game, such as wildcard symbols.

42. A gaming apparatus according to claim 1, wherein gaming apparatus is arranged such that a player is able to choose to enter into one or more rounds of the game such that entry into each subsequent round after the first round risks losing a prize or a portion of a prize, or the player is able to choose to end the game and receive a prize won thus far.

43. A gaming apparatus according to claim 1, wherein the gaming apparatus is implemented as a stand alone gaming machine or across a network.

44. A gaming apparatus according to claim 1, wherein the gaming apparatus forms part of a gaming system.

45. A method of playing a game using a gaming apparatus comprising a movable symbol selector having a plurality of presentation portions, wherein each portion is associated with one or more symbols of a first set of symbols; and a reference object comprising a plurality of parts over which the selector can be moved, wherein each part is associated with one or more symbols of a second set of symbols, wherein when the symbol selector moves relative to the reference object at least one relationship is formed between at least one of the selector portions and at least one of the reference object parts, wherein some of the first set of symbols are also in the second set of symbols, and wherein the at least one relationship is for use in a determining a game outcome, the method comprising:

moving the symbol selector relative to the reference object;

determining which of the portions form a relationship with which of the parts and the corresponding symbols according to the at least one portion-part relationship;

determining the game outcome according the determined symbols.

46. A method according to claim 45, wherein the outcome of the game is a win in the event that the one or more of the related symbols are the same.

47. A method according to claim 45, wherein a quantum of the outcome the game is based on the number of related symbols that are the same.

48. A method according to claim 45, wherein a quantum of the outcome the game is based on which selector symbols are related to which reference object symbols.

49. A game controller for controlling a gaming system, the gaming system comprising:

a movable symbol selector having a plurality of presentation portions, wherein each portion is associated with one or more symbols of a first set of symbols; and a reference object comprising a plurality of parts over which the movable object can be moved, wherein each part is associated with one or more symbols of a second set of symbols, wherein the game controller is arranged to cause:

the movable object to move relative to the reference object so that at least one relationship is formed between at least one of the selector portions and at least one of the reference object parts;

wherein the at least one relationship is for use in determining a game outcome; and wherein some of the first set of symbols are also in the second set of symbols.

50. A game controller according to clam 49, wherein the game controller is arranged to determine the respective symbols associated with each portion and part of each formed relationship for use in determining the outcome of the game.

51. A game controller according to claim 50, wherein the processor is configured to control the display to separately display the determined symbols.

52. A game controller according to claim 49, wherein the game controller is arranged to cause displaying of the movable symbol selector and the reference object on a display.

53. A game controller according to claim 52, comprising a processor configured to control movement of the symbol selector relative to the reference object.

54. A game controller according to claim 53, wherein the processor is configured to operate a symbol selection component which determines the movement or movements of the movable object so that when the symbol selector is moved the at least one relationships are formed according to the determined movement or movements.

55. A method of playing a game using a game controller for controlling a gaming system, the gaming system comprising: a movable symbol selector having a plurality of presentation portions, wherein each portion is associated with one or more symbols of a first set of symbols; and a reference object comprising a plurality of parts over which the movable object can be moved, wherein each part is associated with one or more symbols of a second set of symbols, wherein some of the first set of symbols are also in the second set of symbols, and wherein the game controller is arranged to cause: the movable object to move relative to the reference object so that at least one relationship is formed between at least one of the selector portions and at least one of the reference object parts, wherein the at least one relationship is for use in determining a game outcome, the method comprising:

displaying moving of the symbol selector over the reference object;

determining the game outcome according the determined symbols.

56. A method of playing a game comprising:

moving a symbol selector over a reference object, wherein the symbol selector has a plurality of presentation portions, wherein each portion is associated with one or more symbols of a first set of symbols, wherein the reference object has a plurality of parts over which the selector can move, wherein each part is associated with one or more symbols of a second set of symbols, wherein when the symbol selector moves relative to the reference object at least one of the portions will form at least one relationship with at least one of the parts, and wherein some of the first set of symbols are also in the second set of symbols;

determining a game outcome according to the formed relationships.

57. A method according to claim 56, further comprising determining which of the portions form a relationship with which of the parts and which respective symbols are associated with each part of the formed relationships, and determining the game outcome based on the determined symbols.

58. Logic embodied in a machine readable form for controlling a processor to perform a method of playing a game comprising instructions for controlling the processor to:

display a moveable symbol selector having a plurality of presentation portions, wherein each portion is associated with one or more symbols of a first set of symbols;

display a reference object comprising a plurality of parts over which the selector can move, wherein each part is associated with one or more symbols of a second set of symbols;

display the symbol selector moving relative to the reference object with at least one of the portions forming at least one relationship with at least one of the parts;

wherein the at least one relationship is for use in determining a game outcome, and wherein some of the first set of symbols are also in the second set of symbols.

* * * * *

UNITED STATES PATENT AND TRADEMARK OFFICE

CERTIFICATE OF CORRECTION

PATENT NO. : 8,226,464 B2
APPLICATION NO. : 12/339727
DATED : July 24, 2012
INVENTOR(S) : Hyong Joo Kim It is certified that error appears in the above-identified patent and that said Letters Patent is hereby corrected as shown below:

In column 17, lines 7-8 (claim 45), after "at least one relationship is for use in" and before "determining a game outcome," please delete "a".

In column 17, line 43 (claim 50), after "A game controller according to," please delete "clam 49" and add "claim 49".

Signed and Sealed this
Twenty-seventh Day of November, 2012

David J. Kappos
*Director of the United States Patent and Trademark Office*